United States Patent
Suwa

(10) Patent No.: US 6,347,023 B1
(45) Date of Patent: *Feb. 12, 2002

(54) INFORMATION RECORDING APPARATUS WITH VOICE COIL MOTOR AND COVER THEREOF

(75) Inventor: Masaya Suwa, Tokyo (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 47 days.

(21) Appl. No.: 09/035,525

(22) Filed: Mar. 5, 1998

(30) Foreign Application Priority Data

Sep. 26, 1997 (JP) .............................. 9 262545

(51) Int. Cl.[7] ................................. G11B 5/55
(52) U.S. Cl. ................................. 360/264.8
(58) Field of Search ............................. 360/106, 97.01, 360/97.02, 264.7, 264.8

(56) References Cited

U.S. PATENT DOCUMENTS 5,021,905 A * 6/1991 Sleger ...................... 360/97.02
5,315,466 A * 5/1994 Nishimoto et al. ......... 360/106
5,963,398 A * 10/1999 Tohkairin ................... 360/106

FOREIGN PATENT DOCUMENTS

| JP | 2-154385 | 6/1990 |
| JP | 4345974 | 12/1992 |
| JP | 541044 | 2/1993 |
| JP | 6-236660 | 8/1996 |

* cited by examiner

Primary Examiner—Robert S. Tupper
(74) Attorney, Agent, or Firm—Greer, Burns & Crain, Ltd.

(57) ABSTRACT

A side yoke is integrally formed on a cover of magnetic material in a magnetic disk drive unit by cutting and folding a portion of the cover. When the cover is attached to a housing body of magnetic material, the cover, the side yoke and the bottom of the housing body form a yoke for voice coil motor. The magnetic flux from a magnet circulates in the yoke and serves to drive a voice coil disposed in a gap of the yoke. The integral formation of the side yoke to the cover contributes to reduction in the number of parts, and leads to a facilitated assembling and manufacturing.

17 Claims, 9 Drawing Sheets

INFORMATION RECORDING APPARATUS WITH VOICE COIL MOTOR AND COVER THEREOF

BACKGROUND OF THE INVENTION

1. Field of the Invention

The present invention relates to a yoke for a voice coil motor, defining a gap in which a voice coil is disposed, and introducing a magnetic flux from a magnet to the gap so as to drive the voice coil in response to an electric current flowing through the voice coil.

A voice coil motor including the above-mentioned yoke is in particular applied to an information recording apparatus for driving a recording and/or reproducing head along an information recording medium in accordance with the movement of the voice coil. The information recording apparatus may be represented by a magnetic disk drive unit, and so on.

2. Description of the Prior Art

Reduction in size and weight is required in a portable information processing terminal such as a personal computer of notebook type. Accordingly, the requirement to reduce the size of a file unit or magnetic disk drive unit, which is installed in a portable information processing terminal of small size, is becoming severer.

For example, Japanese Patent Laid-open publication No. 4-345974 discloses one method to reduce the thickness of a magnetic disk drive unit. The method provides a yoke for a voice coil motor unified with a housing of the magnetic disk drive unit. The same idea can also be observed from Japanese Patent Laid-open publication No. 5-41044, FIG. 5, and Japanese Patent Laid-open publication No. 6-236660.

The performance of an actuator depends upon the intensity or density of magnetic flux in the gap. The density of magnetic flux can be improved by increasing magnetic force from the magnet, or by increasing saturation flux density in the yoke. As the density of magnetic flux increases, the acceleration performance of an actuator can be improved. On the other hand, if adequate acceleration performance is already realized, the size and thickness of the magnet may be reduced.

In a given case where a gap is defined by upper and lower yokes, for example, the density of magnetic flux can be improved by providing a side yoke for connecting the upper and lower yokes so as to reliably circulate lines of the magnetic flux. However, techniques disclosed in the above-mentioned publications fail to consider the advantages of the side yoke.

SUMMARY OF THE INVENTION

The object of the present invention is accordingly to provide a yoke for a voice coil motor capable of increasing the density of a magnetic flux by reliably circulating a magnetic flux through a side yoke, so as to contribute to further reduction in size and thickness of an information recording apparatus such as a magnetic disk drive unit. Another object of the present invention is to provide an information recording apparatus and a cover thereof capable of reducing the number of parts and the assembling and production cost.

According to a first aspect of the present invention, there is provided an information recording apparatus comprising: a head; a carriage carrying the head; a housing body supporting the carriage; a cover made of a magnetic plate forming a side yoke; a lower yoke magnetically connected to the cover through the side yoke; a magnet mounted on at least one of the cover and lower yoke; and a coil mounted on the carriage and disposed between the cover and lower yoke.

According to a second aspect of the present invention, there is provided a cover made of a magnetic plate for an information recording apparatus, forming a upper yoke opposed to a lower yoke provided in a housing body when the cover closes the housing body, and a side yoke connecting the upper and lower yokes within the housing body when the cover closes the housing body.

The housing body may enclose a recording and/or reproducing head capable of recording and/or reproducing information data from and/or to an information recording medium. The cover may close an opening defined in the housing body. The lower yoke may be opposed to the cover so as to define a gap between the cover and itself. Magnetic flux generated from the magnet flows through the cover and lower and side yokes. When an electric current is supplied to the coil, the coil moves in response to the supplied electric current based on the magnetic flux introduced to the gap. The movement of the coil is transmitted to the head by means of the carriage. The integral formation of the side yoke to the cover contributes to reduction in the number of parts, and to a facilitated assembling and manufacturing leading to reduction in production cost. Moreover, connections between parts in the yoke are reduced so that the loss of the magnetic flux flowing through the yoke can be restrained to the utmost. This may allow reduction in size and thickness of the magnet. In particular, if the magnetic plate is processed by a press for forming the cover and side yoke, it is possible to reduce the cost for making a mold.

In addition, the cover may also form the lower yoke in the information recording apparatus. This may contribute to further reduction in connections between parts in the yoke. The loss of the magnetic flux in the yoke may further be reduced. In particular, if the magnetic plate is processed by a press for forming the cover and side and lower yokes, it is possible to reduce the cost for making a mold.

A gap adjustment protrusion may be embossed on the cover by a press. The protrusion may serve to adjust an extent of the gap between the upper and lower yokes in the information recording apparatus. The adjustment of the extent of the gap enables control for the density or intensity of the magnetic flux generated in the gap.

A positioning protrusion may be embossed by the press for positioning the magnet. Otherwise, a positioning recess may be formed by etching on the cover for positioning the magnet in place of the positioning protrusion. In either cases, positioning the magnet serves to allow the magnetic flux from the magnet to reliably circulate in the yoke for voice coil motor.

According to a third aspect of the present invention, there is provided an information recording apparatus comprising: a head; a carriage carrying the head; a housing body made of magnetic material and supporting the carriage; a cover made of a magnetic plate forming a side yoke; the side yoke magnetically connected to a bottom of the housing body; a magnet mounted on at least one of the cover and the bottom of the housing body; and a coil mounted on the carriage and disposed between the cover and the bottom of the housing body.

With the arrangement of the third aspect, the cover and housing body serving also as the upper and lower yoke for defining the gap enables, in addition to the advantages of the first and second aspects, reduction in thickness of the information recording apparatus. Moreover, if the housing body is formed from a magnetic plate by a press, a facilitated production process and a reduced cost for a mold can also be achieved.

Additionally, the information recording apparatus may further comprise a carriage axis of magnetic material extending between the cover and the bottom of the housing body for rotatably supporting the carriage. With this arrangement, the carriage axis also provides a path for lines of the magnetic flux connecting the upper and lower yokes in addition to the side yoke, so that the saturation flux density in the yoke may be further improved.

In any aspects of the present invention, the adjustment of the thickness of the cover and housing body may serve to control the density or intensity of the magnetic flux for driving the voice coil. For example, the information recording medium preferably comprises a magnetic disk having a diameter of 1.8 inches or less in case where the present invention is applied to a magnetic disk drive unit including the recording and/or reproducing head comprising a magnetic head.

The magnetic plate employed in the present invention may be a silicon steel plate with nickel plating, a stainless steel plate of SUS4 and SUS3 systems according to Japan Industrial Standard, a vibration suppression plate comprising layers of a synthetic resin material and a metal material, and the like. These plates serve to improve the rigidity of the yoke as compared with yokes of aluminum casting. The improvement of the rigidity in the yoke may contribute to improvement in positioning the head, leading to an accurate writing and/or reading operation of information data. In particular, the employment of the vibration suppression plate serves to prevent vibration from the outside to transmit to the head and/or recording information medium, so that the accurate writing and/or reading operation can be further enhanced.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENTS

Figure 1:
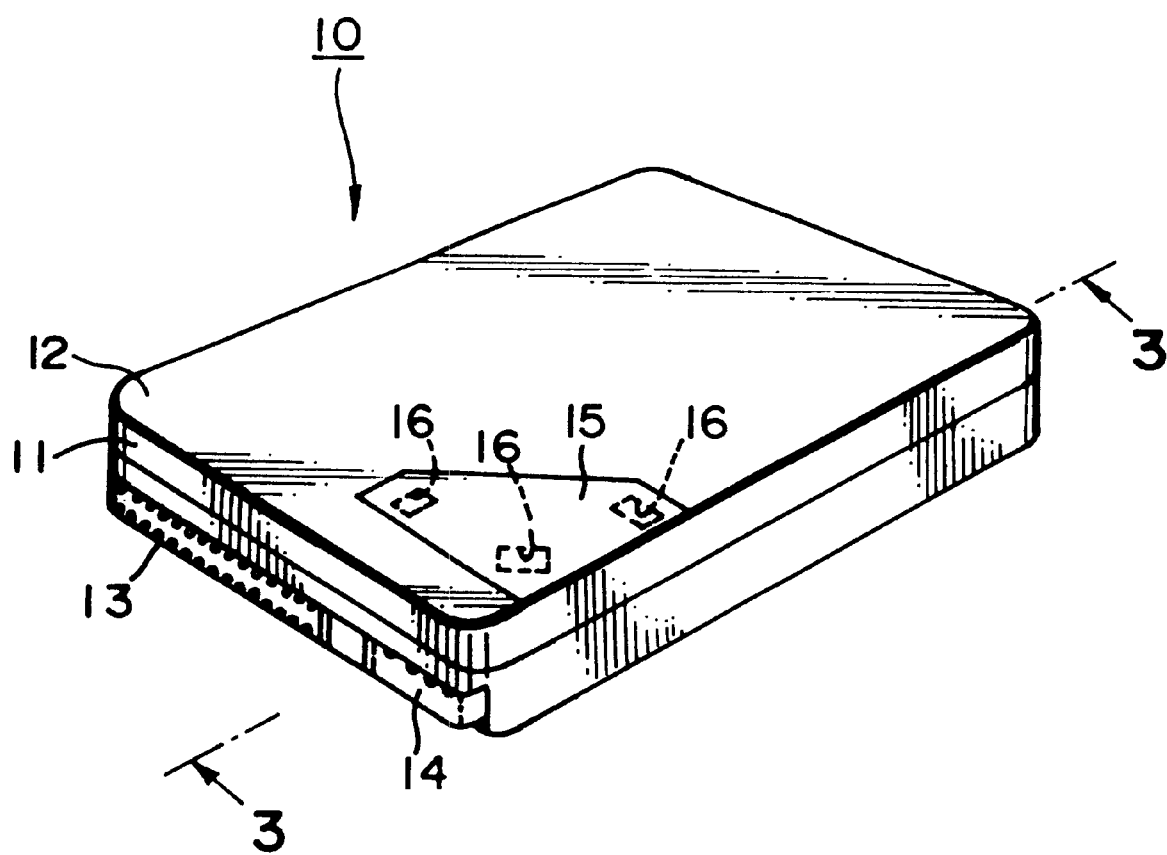
FIG. 1 schematically illustrates the outlook of a hard disk drive unit according to a first embodiment of the present invention.

FIG. 1 illustrates a hard disk drive unit as an information recording apparatus according to a first embodiment of the present invention. The hard disk drive unit 10 comprises a housing body 11 defining an inner space, and a cover 12 for closing an opening defined in one large plane of the housing body 11. A substrate, not shown, with a data connector terminal 13 and a power supply connector terminal 14 is fixed to the rear face of the housing body 11.

An adhesive tape 15 (FIG. 3) is attached to the front face of the cover 12 so as to close holes 16, which are defined during production of the cover 12. The holes 16 are described later more in detail. The adhesive tape 15 serves to shut off the inner space within the housing body 11 air-tightly closed by the cover 12 from the outside. The adhesive tape 15 is preferably made of a copper tape. The copper tape may reliably shut out noise from the outside.

Figure 2:
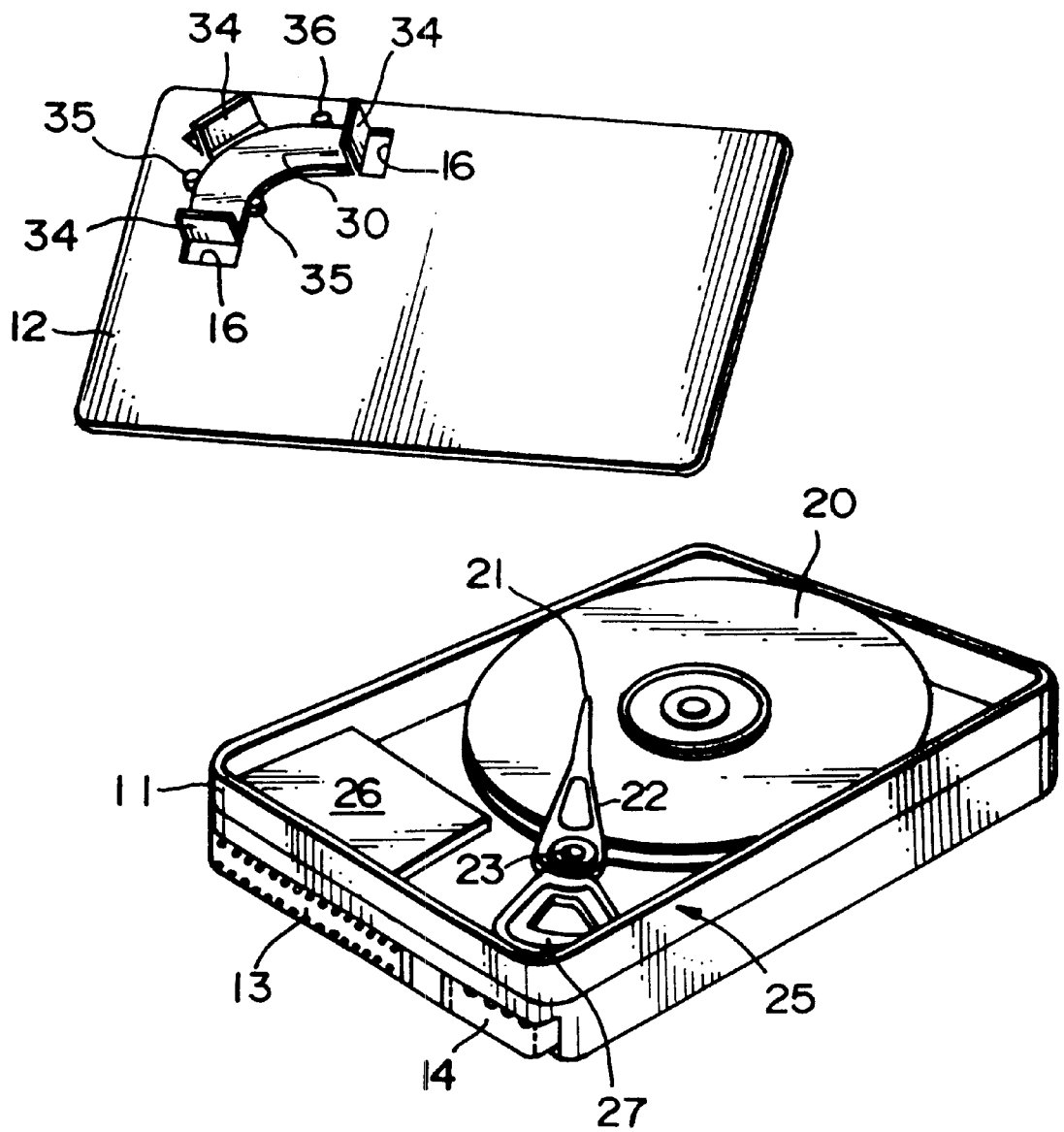
FIG. 2 illustrates the inner structure of the hard disk drive unit.

Within the housing body 11 are disposed, as shown in FIG. 2, a magnetic disk 20 driven for rotation by a spindle motor, not shown, and a magnetic head 21 for recording and reproducing information to and from the magnetic disk 20. The magnetic head 21 is attached to a tip end of a rotary carriage 22 so as to be opposed to a disk surface of the magnetic disk 20. The carriage 22 is rotatably supported by a carriage axis 23 extending between the cover 12 and the bottom of the housing body 11.

The magnetic head 21 is driven by an actuator 25 comprising a magnetic circuit. The actuator 25 is designed to displace the magnetic head 21 along the disk surface of the magnetic disk 20 in accordance with instructions from a control circuit 26. The control circuit 26 provides the actuator 25 with instruction signals based on information data supplied through the data connector terminal 13, for example, from a CPU in a computer, not shown.

Figure 3:
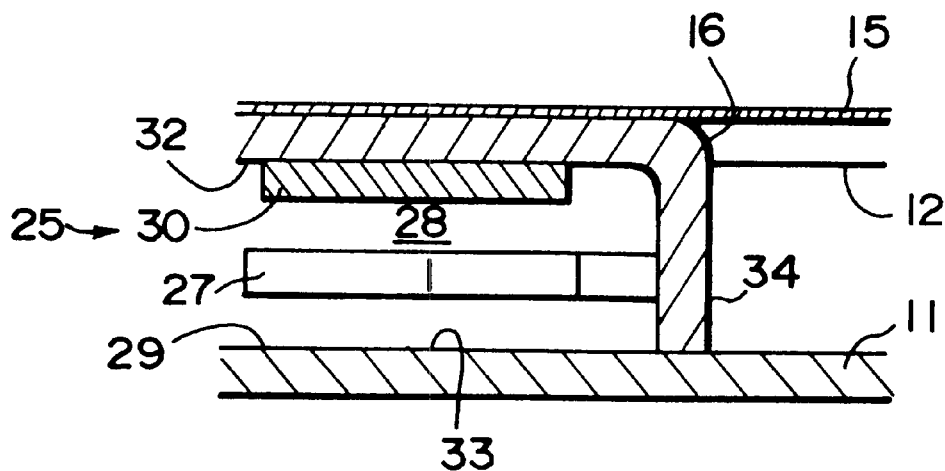
FIG. 3 illustrates an enlarged, partial, sectional view taken along the line 3—3 in FIG. 1.
Figure 4:
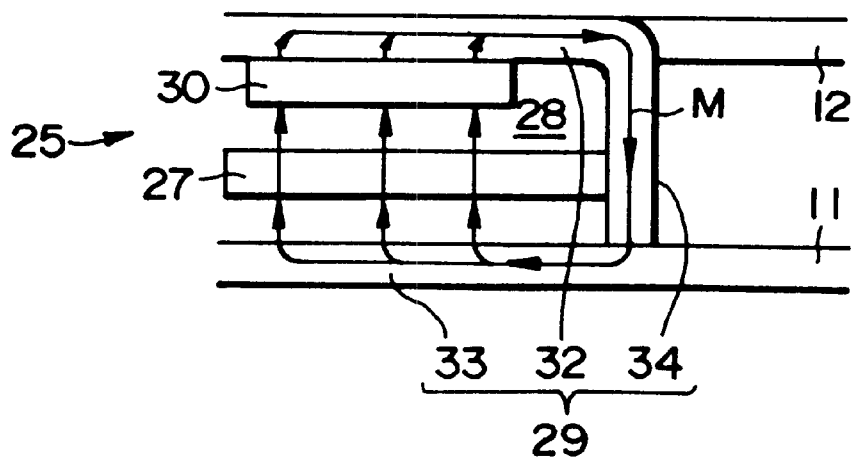
FIG. 4 illustrates lines of magnetic flux in the yoke.

Referring also to FIG. 3, the actuator 25 comprises a voice coil 27 attached to the other end of the carriage 22 for receiving an electric current from the control circuit 26, and a yoke 29 defining a gap 28 in which the voice coil 27 is disposed. The yoke 29 serves to introduce to the gap 28 a magnetic flux M generated from a magnet 30 attached to the yoke 29, as shown in FIG. 4. When an electric current is supplied to the voice coil 27 from the control circuit 26, the voice coil 27 displaces in the gap 28 in accordance with the direction and magnitude of the electric current flowing in the voice coil 27, based on the Fleming's rule. The displacement of the voice coil 27 is transmitted to the magnetic head 21 via the carriage 22 rotating about the carriage axis 23. The magnetic head 21 is accordingly positioned to a recording track on the magnetic disk 20 by controlling an electric current flowing through the voice coil 27.

As is apparent from FIGS. 2 and 3, the yoke 29 comprises an upper yoke 32, and a lower yoke 33 opposed to the upper yoke 32 for defining the gap 28 between the yokes 32 and 33. The cover 12 of magnetic material serves as the upper yoke 32, while the bottom of the housing body 11 of magnetic material serves as the lower yoke 33. Three side yokes 34 are formed by cutting out portions of the cover 12. Each of the side yokes 34 connects the upper and lower yokes 32, 33 for a magnetic path within the inner space of the housing body 11. The magnet 30 is attached to the upper yoke 32 and surrounded by the side yokes 34. The magnet 30 is positioned at a predetermined location by positioning protrusions 35 which are integrally formed with the cover 12.

A retract boss (FIG. 1) may be formed on the inner surface of the cover 12 so as to be opposed to a retract magnet, not shown, fixed to the upper surface of the voice coil 27. The retract boss 36 and magnet serve to reliably position the carriage 22 to the initial position by the magnetic force of the retract magnet.

The description will next be made to manufacture of the yoke. A magnetic plate is first prepared. The plate may be a silicon steel plate with nickel plating, a stainless steel plate of SUS4 and SUS3 systems according to Japan Industrial Standard, a vibration suppression plate comprising layers of a synthetic resin material and a metal material, and the like.

The cover 12 is punched out in a predetermined shape by a press from the prepared magnetic plate. At pressing, three side yokes 34 are also formed by cutting and bending portions of the cover 12 at predetermined locations, as shown in FIGS. 2 and 3. The positioning protrusions 35 and retract boss 36 can also be formed by an embossing process at pressing. After the side yokes 34 have been formed, the magnet 30 is fixed at a predetermined location. The fixation can be achieved by an elastic adhesive, a double-sided adhesive tape made from vibration suppression material such as VEM, and the like.

The magnetic head 21, the carriage 22, the control circuit 26 and the other parts are then accommodated in the housing body 11 as shown in FIG. 2, and the opening of the housing body 11 is air-tightly closed by the cover 12. The cover 12 may be fixed to the housing body 11 by a known method such as screwing. When the cover 12 is fixed, the tips of the side yokes 34 reach the bottom of the housing body 11 so as to connect the upper and lower yokes 32, 33 to each other. With this arrangement, the magnetic flux M from the magnet 30 is designed to circulate through the yoke 29 and led to the gap 28, as shown in FIG. 4. After assembling, the tape 15 closes the holes 16, which are necessarily formed when making the side yokes 34.

As described above, since the cover 12 and housing body 11 respectively serve as the upper and lower yokes 32, 33 in this embodiment, reduction in thickness of the actuator 25, namely, the hard disk drive unit 10 can be achieved as compared with the prior art in which the upper and lower yokes are constructed independently from the cover and housing body. In addition, since the upper and side yokes 32, 34 are integrally formed in the cover 12 out of a common magnetic plate, the number of parts can be reduced as compared with the art in which the side yoke is separately formed, leading to a facilitated manufacture. This integration of yokes 32, 34 to the cover 12 serves to reduce connections between the upper, lower and side yokes 32, 33, 34 in the yoke 29 for voice coil motor, so that the loss of the magnetic flux flowing through the yoke 29 can be restrained, leading to improvement in the saturation flux density in the yoke 29. Accordingly, the size and thickness of the magnet 30 can be reduced. If it is not necessary to improve the magnetic force from the magnet 30, the amount of an electric current to be supplied to the voice coil 27 can be reduced.

In particular, the manufacture of the cover 12 and side yoke 34 by pressing serves to eliminate a subsequent processing to the cover 34 and yoke 34, so that manufacturing cost for the cover can be reduced. Further, the pressing may serve to reduce the cost for forming a mold as compared with a casting. Furthermore, the use of steel plates and stainless plates may achieve the improvement in rigidity as compared with an aluminum casting, so that the accuracy in positioning the magnetic head 21 may be improved. Shock resistance may also be improved.

It is known that the intensity of a magnetic field generated in the gap 28 depends upon the magnetic force and thickness of the magnet 30 and the thickness of the yoke 29. When the cover 12 and housing body 11 serve as the upper and lower yokes 32, 33 respectively, the thickness of the cover 12 and the housing body 11 should be adjusted in view of the acceleration performance required to the actuator 25. Accordingly, the diameter of the magnetic disk 20 is preferably set at 1.8 inches or less, for example. In this case, the magnetic head 21 and carriage 22 are made compact in size and light in weight, so that the thickness of 1mm for the cover 12 and the housing body 11 brings an enough acceleration performance to the actuator 25. Reduction in thickness of the housing body 11 enables pressing the housing body 11 out of the aforementioned magnetic plate.

If the carriage axis 23 is formed from magnetic material, the carriage axis 23 also serves to magnetically connect the upper and lower yokes 32, 33 in addition to the side yokes 34. This contributes to further improvement of the saturation flux density in the yoke 29.

It should be noted that a recess formed by etching may be employed in place of the embossed positioning protrusions 35 for positioning the magnet 30. The etching may be applied to by using ferrous chloride.

Figure 5:
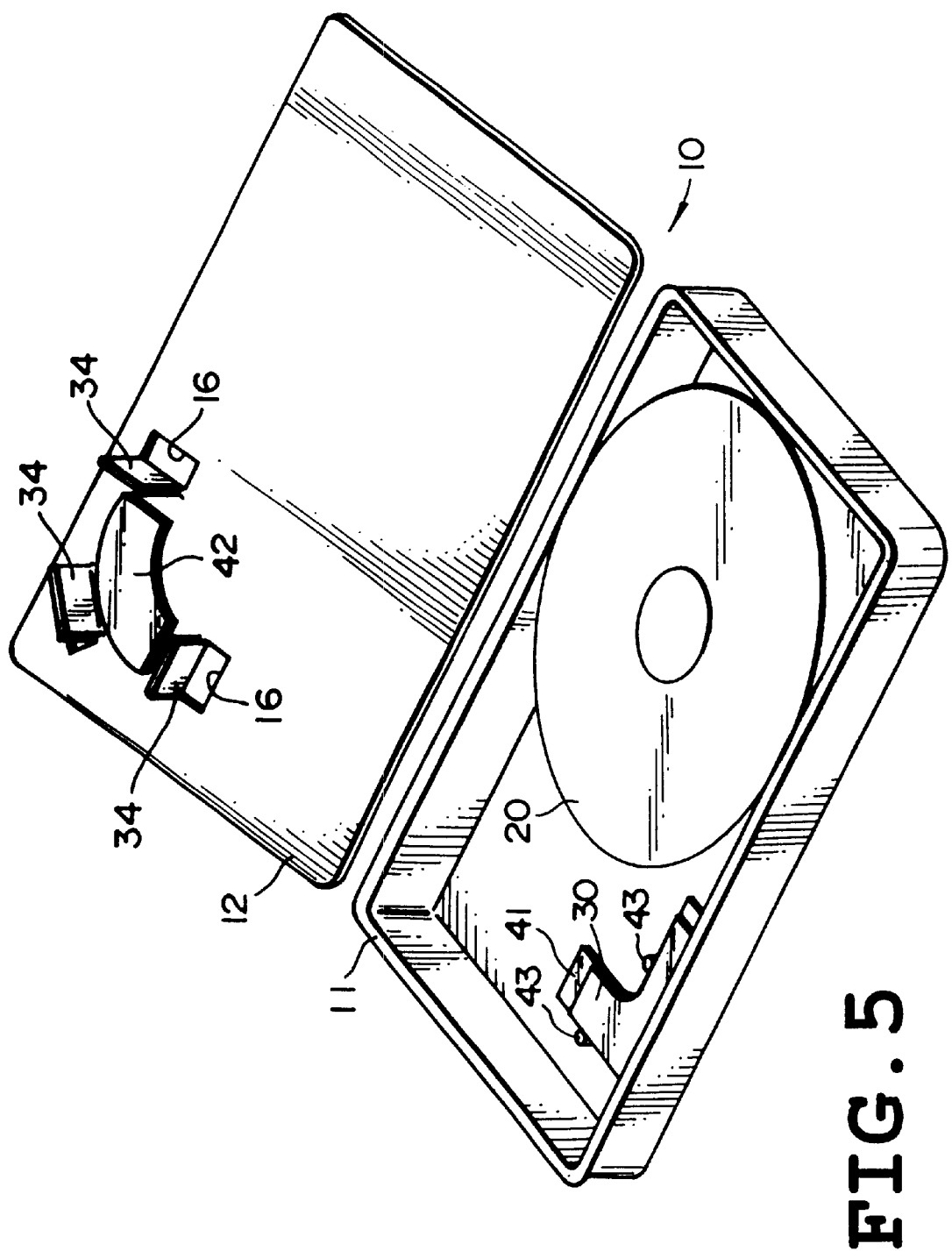
FIG. 5 schematically illustrates the inner structure of a hard disk drive unit according to a second embodiment of the present invention.

FIG. 5 schematically illustrates the structure of a hard disk drive unit as an information recording apparatus according to a second embodiment of the present invention. In this embodiment, the thickness of the yoke 29 is increased by additionally disposing a separate lower yoke on the bottom of the housing body 11. The increase in the thickness of the yoke 29 may bring an enough acceleration performance of the actuator 25 in connection with the magnetic disk 20 having a diameter larger than 1.8 inches. The structure with the same function as of the aforementioned first embodiment is identified by the same reference numerals.

More specifically, a lower yoke 41 made from magnetic material is fixed on the bottom of the housing body 11. The magnet 30 is fixed over the upper surface of the lower yoke 41. Positioning protrusions 43 may be embossed by a press on the bottom of the housing body 11 in fixing the lower yoke 41. Otherwise, a recess formed by etching may be employed in place of the positioning protrusions 43.

Figure 6:
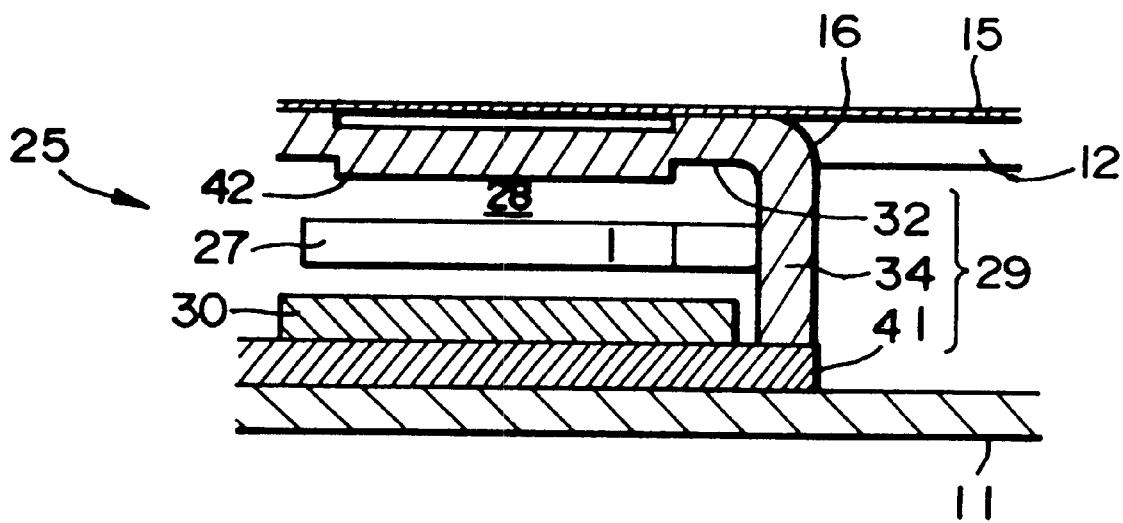
FIG. 6 illustrates an enlarged, partial, sectional view in the second embodiment corresponding to FIG. 3.

A gap adjustment protrusion 42 is formed on the inner surface of the cover 12. The extent of the gap 28 in the yoke 29 can be adjusted by this gap adjustment protrusion 42. As the extent of the gap 28 is reduced, the intensity of the magnetic field generated in the gap 28 may be increased. The gap adjustment protrusion 42 may be embossed by a press while forming the cover 12. When the opening of the housing body 11 is closed by the cover 12, the tips of the side yokes 34 formed by a press contact the lower yoke 41 as shown in FIG. 6. The magnetic force generated in the magnet 30 is transmitted via the gap 28, the cover 12 and the side yokes 34 to the lower yoke 41 and finally returns to the magnet 30. According to this embodiment, it is possible to increase the intensity of the magnetic field in the gap 28 by increasing the thickness of the lower yoke while achieving the same advantages as of the aforementioned first embodiment.

Figure 7:
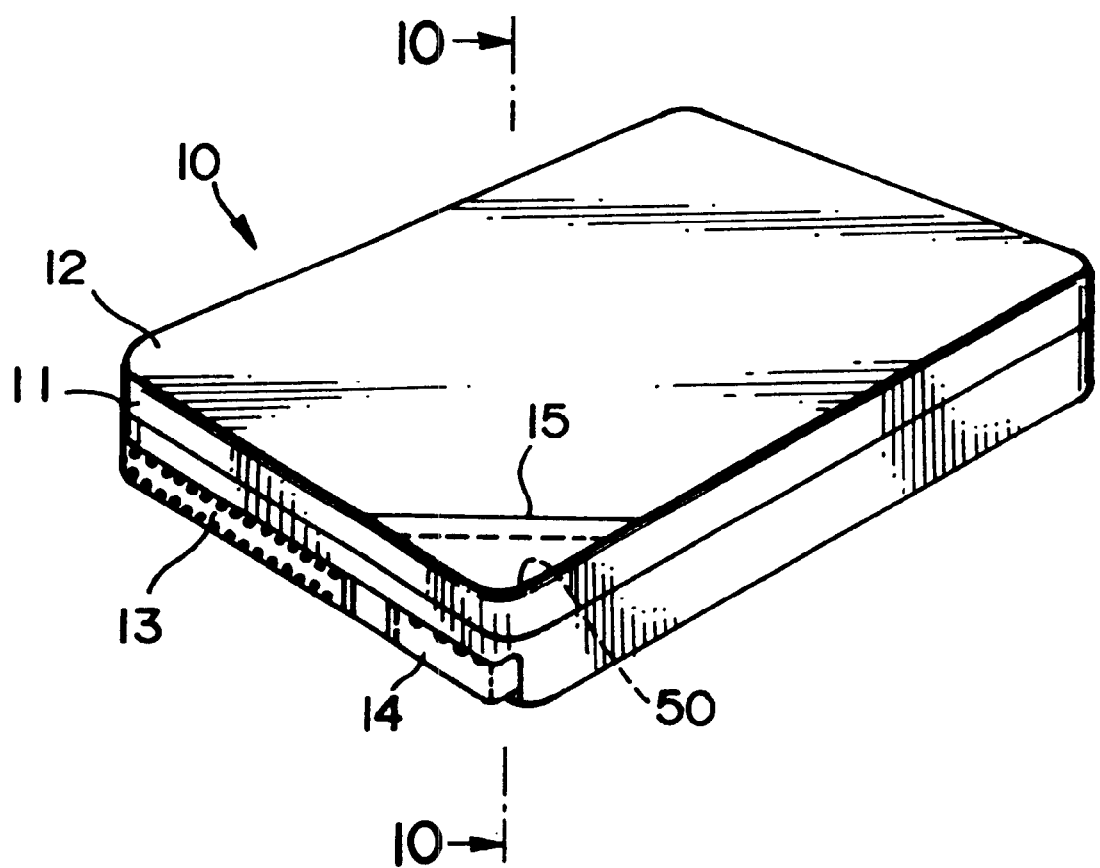
FIG. 7 schematically illustrates the outlook of a hard disk drive unit according to a third embodiment of the present invention.

FIG. 7 illustrates a hard disk drive unit as an information recording apparatus according to a third embodiment of the present invention. In this embodiment, the upper, lower and side yokes of the yoke for voice coil motor are integrally punched out from a common magnetic plate. A corner 50 remaining open when the cover 12 closes the opening of the housing body 11 is closed by the adhesive tape 15. The structure with the same function as of the aforementioned first embodiment is identified by the same reference numerals.

Figure 8:
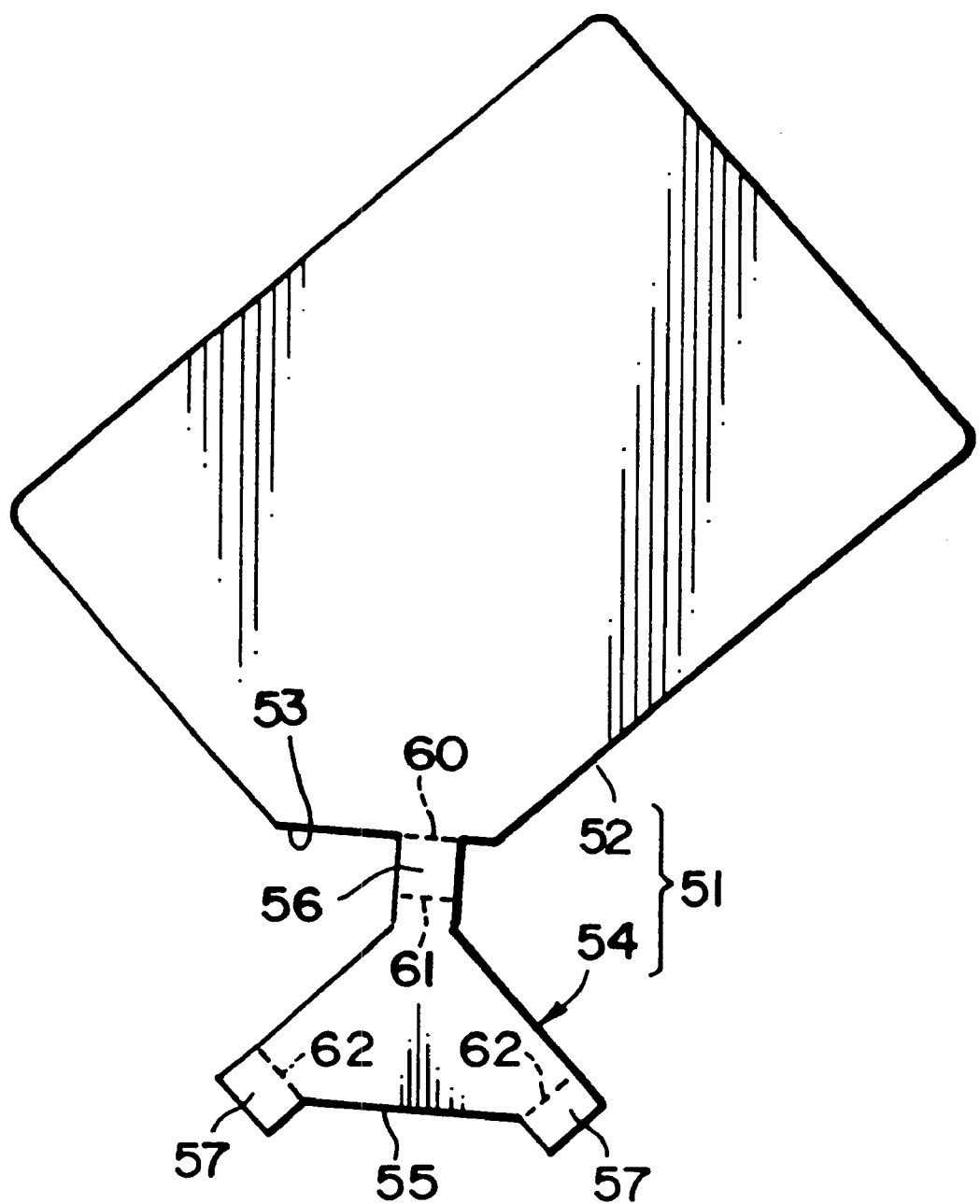
FIG. 8 illustrates a plan view of a cover material punched out by a press.

A cover material 51 is prepared for forming the cover 12 and the yoke by punching out a magnetic plate as shown in FIG. 8. The plate may be a silicon steel plate with nickel plating, a stainless steel plate of SUS4 and SUS3 systems according to Japan Industrial Standard, a vibration suppression plate comprising layers of a synthetic resin material and a metal material, and the like.

The cover material 51 comprises a cover body 52 for forming the cover 12. A splay portion 53 is formed on the cover body 12 so as to correspond to the corner 50 of the housing body 11. A yoke forming member 54 is continuously formed to the splay portion 53 for forming the side and lower yokes of the yoke for voice coil motor. The yoke forming member 54 comprises a lower yoke shape member 55 of a triangle shape for forming the lower yoke, first and second side yoke shape members 56, 57 continuously formed to three apices of the lower yoke shape member 55 for forming first and second side yokes. The first side yoke shape member 56 at the sole right angle apex functions to connect the cover body 52 and the yoke forming member 54 to each other.

Figure 9:
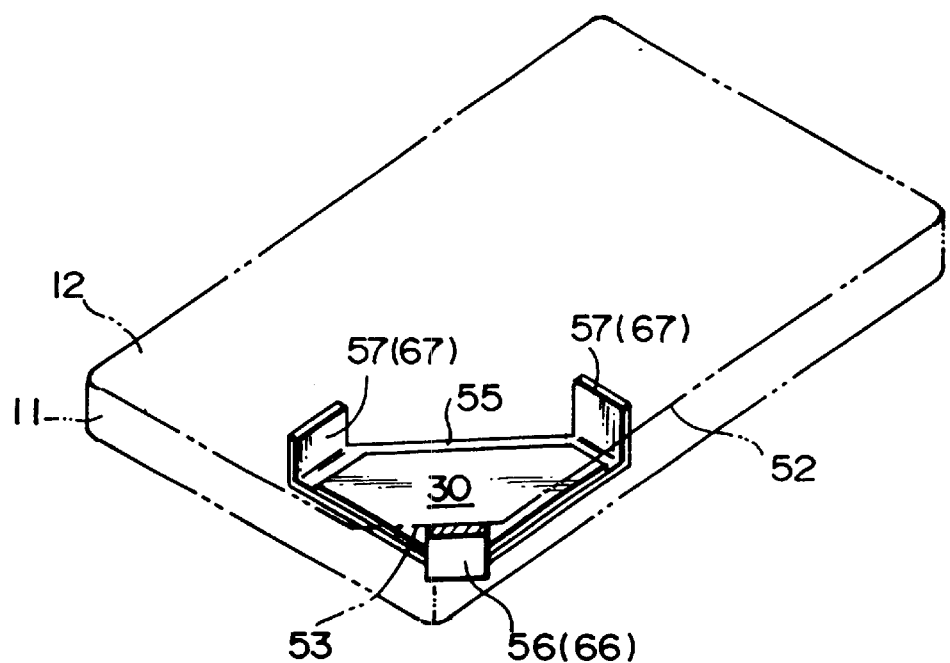
FIG. 9 illustrates a perspective view of a housing body and a cover for showing side and lower yokes.

When the first side yoke shape member 56 is folded at a first fold line 60 to be perpendicular to the cover body 52 and the lower yoke shape member 55 is further folded at a second fold line 61 to be perpendicular to the folded first side yoke shape member 56, the lower yoke shape member 55 is brought in parallel to the cover body 52 or cover 12 as shown in FIG. 9. The second side yoke shape members 57 are then folded at two third fold line 62 so as to bring their tips in contact with the inner surface of the cover body 52 or cover 12 as shown in FIG. 9. The yoke 29 is accordingly formed, as shown in FIG. 10, by the upper yoke 65 provided by the cover 12 made of the cover body 52 of the cover material 51, the first and second side yokes 66, 67 made of the first and second side yoke shape members 56, 57 of the material 51, and the lower yoke 68 made by the lower yoke shape member 55 of the material 51.

The integral formation of the cover 12, the side yokes 66, 67 and the lower yoke 68 enables the complete assembly of the yoke 29 prior to the attachment of the cover 12 to the housing body 11. Thus, the dimension of the yoke 29 can properly be adjusted before the attachment. It serves to achieve a reliable connection between the tips of the second side yokes 67 and the inner surface of the cover 12. Moreover, the upper and lower yokes 65, 68 are seamlessly connected to each other as shown in FIG. 10, so that connections in the yoke 29 can still be reduced as compared with the aforementioned first and second embodiments. The loss of the magnetic flux flowing in the yoke 29 can be further reduced, leading to improvement of the saturation flux density in the yoke 29. Further, the employment of a press may enable reduction in the number of parts, a facilitated manufacture, a cost for forming a mold, and so on.

Figure 10:
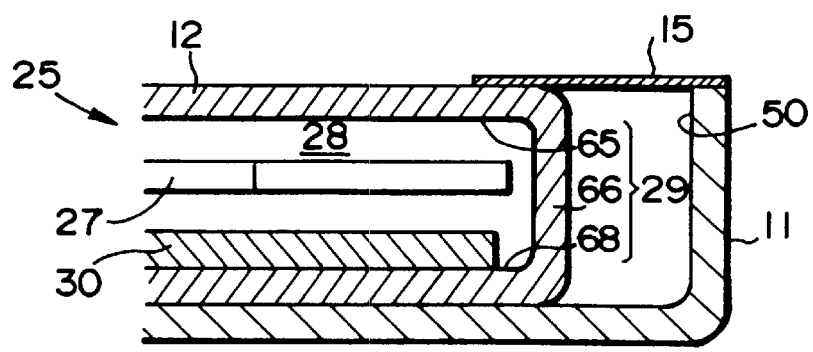
FIG. 10 illustrates an enlarged, partial, sectional view taken along the line 10—10 in FIG. 7.
Figure 11:
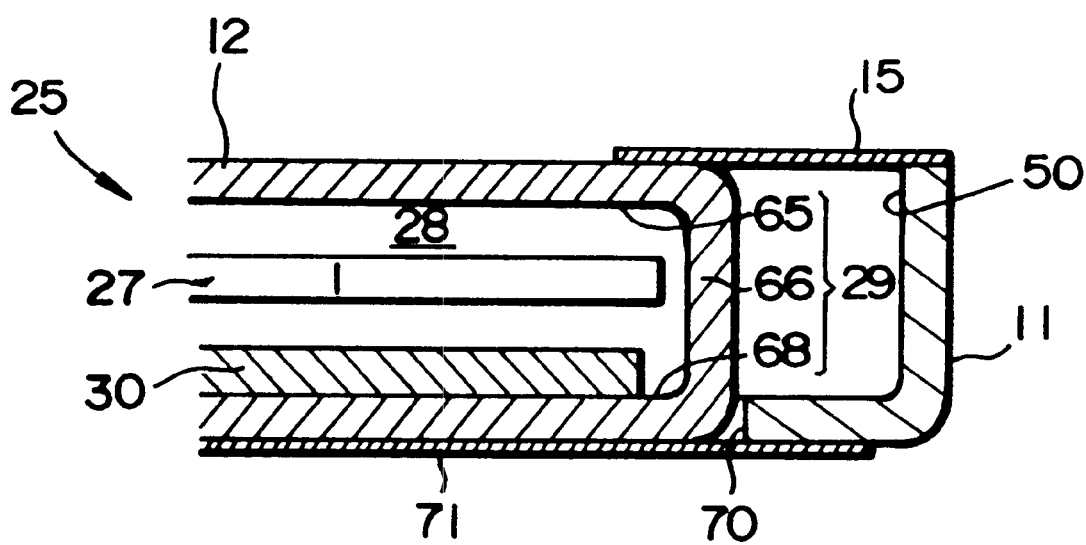
FIG. 11 illustrates an enlarged, partial, sectional view of the modified third embodiment in the same manner as FIG. 10.

In addition, when the lower yoke 68 is seated in contact with the bottom of the housing body 11 of magnetic material, as shown in FIG. 10, it is possible to increase the thickness of the lower yoke 68. However, if it is not necessary to increase the thickness of the lower yoke 68, the lower yoke 68 may be disposed in an opening 70 defined in the bottom of the housing body 11, as shown in FIG. 11. In this case, the opening 70 may be closed with an adhesive tape 71 in the same manner as of the adhesive tape 15.

In the above-described embodiments, it is not always required to make the housing body 11 from magnetic material if the housing body 11 is not expected to function as the lower yoke.

What is claimed is:

1. An information recording apparatus comprising:
   a head;
   a carriage carrying said head;
   a single unitary magnetic plate defining a cover and at least one seamless flange portion normal to said cover, wherein a portion of said cover proximate said flange portion defines an upper yoke of a voice coil motor and said flange portion defines a side yoke portion of the voice coil motor;
   a lower yoke magnetically connected to said upper yoke portion through said side yoke portion;
   a magnet mounted on at least one of said upper yoke portion and said lower yoke;and
   a coil mounted on said carriage and disposed between said upper yoke portion and said lower yoke.

2. The information recording apparatus according to claim 1, wherein the magnetic plate is processed by a press for forming said upper and side yoke portions.

3. An information recording apparatus according to claim 1, wherein said side yoke portion is formed by cutting and folding a portion of the magnetic plate, and an adhesive tape is attached to seal a hole created when said side yoke is formed.

4. The information recording apparatus according to claim 1, wherein a positioning protrusion is integrally formed with at least one of said cover and said housing body.

5. The information recording apparatus according to claim 1, wherein said cover has a thickness configured to provide a predetermined density of a magnetic flux therein.

6. The information recording apparatus according to claim 1, wherein the apparatus is a magnetic disk drive unit and said head is a magnetic head.

7. An information recording apparatus comprising:
   a head;
   a carriage carrying said head;
   a housing body made of a magnetic material and supporting said carriage, said housing body having a lower yoke portion;
   a single unitary magnetic plate defining a cover and at least one seamless flange portion normal to said cover, wherein a portion of said cover proximate said flange portion defines an upper yoke of a voice coil motor and said flange portion defines a side yoke portion of the voice coil motor;
   said side yoke portion being magnetically connected to a bottom of said housing body;
   said upper yoke portion being magnetically connected to said lower yoke portion through said side yoke portion;
   a magnet mounted on at least one of said upper yoke portion and said lower yoke portion; and
   a coil mounted on said carriage and disposed between said upper yoke portion and said lower yoke portion.

8. The information recording apparatus according to claim 7, wherein the magnetic plate is processed by a press for forming said upper yoke portion and said side yoke portion.

9. The information recording apparatus according to claim 7, further comprising, a carriage axis of magnetic material extending between said upper yoke portion and said lower yoke portion for rotatably supporting said carriage.

10. The information recording apparatus according to claim 7, wherein said cover has a thickness configured to provide a predetermined density of a magnetic flux therein.

11. The information recording apparatus according to claim 7, wherein the apparatus is a magnetic disk drive unit and said head is a magnetic head.

12. A cover for a housing of an information recording apparatus having a voice coil motor including a lower yoke, said cover comprising:

a single unitary magnetic plate defining a cover, and at least one seamless flange portion normal to said cover, wherein a portion of the cover proximate said flange portion defines an upper yoke of the voice coil motor and said flange portion defines a side yoke portion of the voice coil motor; wherein said side yoke portion magnetically couples said upper yoke portion with said lower yoke;

wherein the voice coil motor is formed by said upper and side yoke portions in combination with the lower yoke.

13. An information recording apparatus comprising:

a head;

a carriage carrying said head;

a housing body supporting said carriage;

a cover made of a single unitary magnetic plate coupled to said housing body; and an actuator connected to said carriage, wherein said actuator includes:

an upper yoke formed as a section of the cover;

a lower yoke defining a space between the upper yoke and itself;

a side yoke seamlessly extending from said upper yoke so as to touch said lower yoke at a tip end, said cover, said upper yoke, and said side yoke being a single continuous article;

a magnet mounted on at least one of said upper and lower yokes; and a coil mounted on said carriage within said space;

wherein said upper yoke, said side yoke, and said cover are formed from a single unitary plate.

14. The information recording apparatus according to claim 10, further comprising an adhesive tape attached to said cover for closing a void adjacent said upper yoke, said hole having a shape corresponding to a contour of said side yoke.

15. An information recording apparatus comprising:

a head;

a carriage carrying said head;

a housing body made of a magnetic plate and supporting said carriage;

a cover made of a single unitary magnetic plate coupled to said housing body; and an actuator connected to said carriage, wherein said actuator includes:

an upper yoke formed as a section of the cover;

a lower yoke defined as a section of the housing body;

a side yoke seamlessly extending from said upper yoke so as to touch said lower yoke at a tip end, said cover, said upper yoke, and said side yoke being a single continuous article;

a magnet mounted on at least one of said upper and lower yokes; and a coil mounted on said carriage within a space between said upper and lower yokes;

wherein said upper yoke, said side yoke, and said cover are formed from a single unitary plate.

16. The information recording apparatus according to claim 15, further comprising an adhesive tape attached to said cover for closing a void adjacent said upper yoke, said hole having a shape corresponding to a contour of said side yoke.

17. A single unitary magnetic plate article for a cover of an information recording apparatus having a voice coil motor including an upper yoke, a side yoke and a lower yoke, said unitary magnetic plate article comprising:

a cover designed to cover the information apparatus and to define said upper yoke at a section thereof;

a side yoke seamlessly extending from said upper yoke so as to touch said lower yoke at a tip end; and wherein said upper yoke, said side yoke, and said cover are formed from a single unitary plate.

* * * * *

UNITED STATES PATENT AND TRADEMARK OFFICE
CERTIFICATE OF CORRECTION

PATENT NO. : 6,347,023 B1
DATED : February 12, 2002
INVENTOR(S) : Masaya Suwa

It is certified that error appears in the above-identified patent and that said Letters Patent is hereby corrected as shown below:

Column 10,
Line 2, delete "10" insert -- 13 -- therefore.

Signed and Sealed this

Fifteenth Day of October, 2002

Attest:

Attesting Officer

JAMES E. ROGAN
Director of the United States Patent and Trademark Office